United States Patent
Verlaine

(10) Patent No.: US 6,501,028 B1
(45) Date of Patent: Dec. 31, 2002

(54) THERMAL PROTECTION FORMING A HEAT SHIELD

(75) Inventor: Philippe Verlaine, Toul (FR)

(73) Assignee: Philec S.A., Gondreville (FR)

( * ) Notice: Subject to any disclaimer, the term of this patent is extended or adjusted under 35 U.S.C. 154(b) by 0 days.

(21) Appl. No.: 09/719,613

(22) Filed: Dec. 14, 2000

(30) Foreign Application Priority Data

Jun. 18, 1998 (FR) .............................. 98 07808

(51) Int. Cl.⁷ ................................. H01B 7/00
(52) U.S. Cl. ................... 174/121 R; 373/160
(58) Field of Search .................... 174/15.7, 119 C, 174/120 R, 120 C, 120 FP, 120, 121 A, 121 SR, 122 R, 122 G, 122 C, 124 R; 138/147; 373/159, 160, 165

(56) References Cited

U.S. PATENT DOCUMENTS

| | | | |
|---|---|---|---|
| 1,661,254 A | * | 3/1928 | Gillies |
| 2,778,759 A | * | 1/1957 | Stephens et al. |
| 3,451,661 A | * | 6/1969 | Barker |
| 3,828,119 A | | 8/1974 | Warburton ............... 174/121 A |
| 3,862,353 A | | 1/1975 | Morton ................. 174/121 SR |
| 3,881,864 A | * | 5/1975 | Nicol |
| 3,900,701 A | | 8/1975 | Bayles et al. ........... 174/102 R |
| 3,930,915 A | | 1/1976 | Mendelsohn et al. ......... 156/53 |
| 3,995,665 A | | 12/1976 | Monaghan .................. 138/147 |
| 4,054,710 A | | 10/1977 | Botsolas ..................... 428/228 |
| 4,054,711 A | | 10/1977 | Botsolas ..................... 428/228 |
| 4,499,926 A | * | 2/1985 | Friberg |
| 4,713,275 A | | 12/1987 | Riccitiello et al. ............ 428/76 |
| 4,767,656 A | * | 8/1988 | Chee et al. |
| 5,056,564 A | | 10/1991 | Roth .......................... 138/149 |
| 5,104,735 A | | 4/1992 | Cioffi et al. ................ 428/383 |
| 5,126,112 A | | 6/1992 | Burgie ........................ 422/241 |
| 5,229,200 A | | 7/1993 | Sassa et al. ................ 428/280 |
| 5,319,671 A | | 6/1994 | Hopf .......................... 373/145 |
| 5,372,886 A | | 12/1994 | Inazawa et al. ............. 428/384 |
| 5,849,379 A | | 12/1998 | Gladfelter .................. 428/35.8 |
| 6,229,126 B1 | | 5/2001 | Ulrich et al. ................ 219/635 |

FOREIGN PATENT DOCUMENTS

| | | | |
|---|---|---|---|
| DE | 4132390 | 4/1993 | |
| FR | 0 479 680 A1 | 10/1992 | ........... F16L/59/02 |
| GB | 2250996 | 6/1992 | |

* cited by examiner

Primary Examiner—Dean A. Reichard
Assistant Examiner—William H. Mayo, III
(74) Attorney, Agent, or Firm—Gary M. Cohen

(57) ABSTRACT

An electrical conductor covered with an electrically insulating layer and which is required to conduct, for extended durations, a current under high external temperature conditions which can damage the electrically insulating layer, is provided with a thermal protection device for protecting the electrically insulating layer of the electrical conductor, for example, the conducting tubes forming the large inductors of an industrial electroheat furnace. The thermal protection device is formed from at least one layer of a composite refractory, produced as a combination of refractory fibers and a compatible refractory binder, to constitute a heat shield able to withstand external temperatures of between 500 and 1,600° C. Refractory tiles, which can vary in density, can also be provided on the outside of the composite refractory layer.

24 Claims, 1 Drawing Sheet

THERMAL PROTECTION FORMING A HEAT SHIELD

BACKGROUND OF THE INVENTION

The present invention relates to a thermal protection device for electrical conductors, and more particularly, for the electrical conductors of industrial electroheat, inductive, arc, resistance or radiation furnaces.

The conducting turns of the large inductors of industrial induction furnaces are generally formed as hollow copper, profiled tubes. The copper tubes are cooled by circulating water which removes the ohmic losses and the heat released by the high temperature inductive heating load. The profiled tubes are further covered with a layer of electrical insulation, which maintains its mechanical and dielectric properties only up to temperatures of arounnd 200 to 220° C., or perhaps 300° C. in the case of the highest-performance insulations.

This electrical insulation is frequently damaged or burnt since the conducting turns are exposed to various potentials for damage, for example, to splashes of molten metal, to very high levels of heat radiation coming from the crucible or from other heated components (heated white hot), or to streams of gases (carbon, hydrochloric acid, hydrogen, etc.) at high temperature in pyrolysis furnaces.

A defect in the electrical insulation can generate inter-turn arcing, arcing between the turns and the structure of the grounded inductor, or between the turns and the grounded load.

A known solution for remedying this problem is to embed the inductor in a cylinder of refractory concrete or cement. This solution applies to induction heaters for billets, but cannot be generalized since it has several drawbacks. For example, such embedded inductors are bulky and heavy. The refractory coating is cast on site, and replacing an inductor in a large furnace becomes very lengthy and expensive. In the event of a minor fault in an inductor (electrical fault, water leak, etc.), it is very difficult to locate the fault, in order to carry out a partial repair, without having to break the entire concrete encapsulation and without damaging the sound electrical insulation underneath. Also, such embedded inductors are difficult to install and to maintain.

The objective of the present invention is to find a thermal insulation which is capable of withstanding heat shocks and which can solve the above-mentioned problems. Such a solution must, in particular, be lightweight, easy to install, inexpensive and dense enough to be impermeable to heat radiation and to any infiltrations, for example, by carbon or pitch particles.

SUMMARY OF THE INVENTION

The thermal protection of the present invention will not be limited to industrial furnaces, but can also protect the electrical conductors of machines that have to operate as long as possible in the event of a fire, such as motor-driven smoke-exhausting fans, safety lighting, etc.

The foregoing objective is achieved in accordance with the present invention by a thermal protection device for an electrical conductor covered with an electrically insulating layer which is required to conduct, for variable durations, a current under high external temperature conditions which are potentially damaging to the electrically insulating layer. The thermal protection device is formed from at least one layer of a composite refractory produced by a combination of refractory fibers and a compatible refractory binder, so as to constitute a heat shield which is able to withstand external temperatures of between 500 and 1,600° C.

The refractory fibers can be in the form of woven or nonwoven tapes, or in the form of a paste. When implemented in the form of tapes, the tapes are arranged in at least one thickness of overlapping windings around the inductor.

The resulting heat shield can also include a number of refractory tiles tangentially cemented or adhesively bonded to the tubes. Prior taping of the conductor with refractory fibers permits good attachment of the refractory adhesive to the electrically insulated conductor.

The present invention will be more clearly understood with reference to the description given below, together with the following figures.

DETAILED DESCRIPTION OF THE INVENTION

Figure 1:
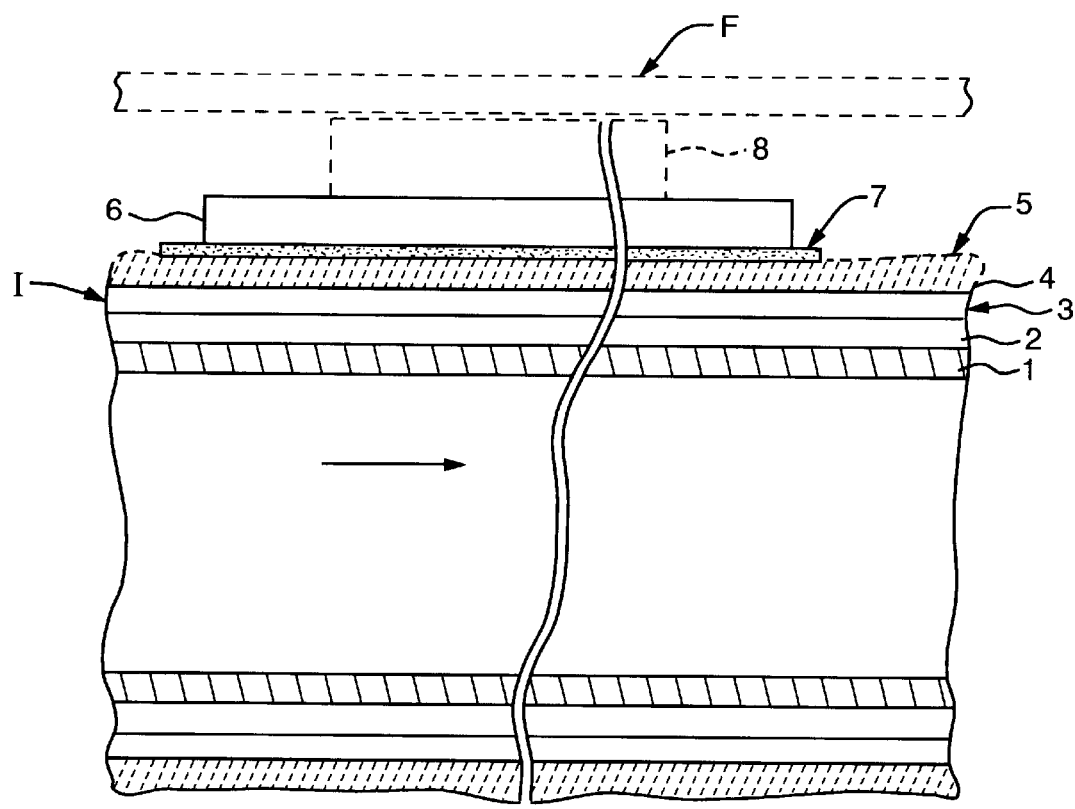
FIG. 1 is a schematic cross-sectional view of a conducting tube which is electrically and thermally insulated in accordance with the present invention.

The conducting turns of an inductor (I) of an industrial furnace (F) are comprised of copper tubes (1) in which cooling water circulates. In a manner which is itself known, the outside of each tube (1) is covered with an electrically insulating layer (2) and, optionally, with a skin of a silicone elastomer (3). The layer (2) and the skin (3), if used, can become damaged above 220 to 250° C.

In accordance with the present invention, the tube (1) is covered (over the top of the electrical insulation (2) and the elastomer skin (3), if used) with a refractory composite layer which acts as a heat shield which is capable of withstanding a very large temperature gradient.

As an example, the external face of the heat shield can be exposed to temperatures of about 1,000° C., while its internal face (directed toward the axis of the tube) does not exceed approximately 200 to 220° C. The thickness of the heat shield and the nature of its components will depend on the level of the external temperature to which the conductor is exposed.

Figure 2:
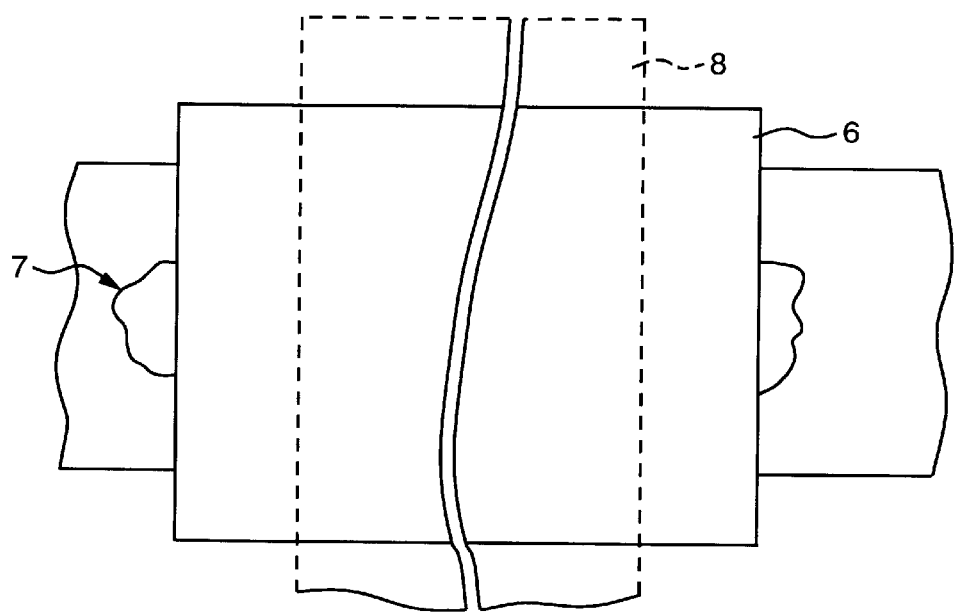
FIG. 2 is a schematic top plan view of the conducting tube shown in FIG. 1.

A preferred, but non-limiting embodiment of the present invention is illustrated in FIGS. 1 and 2. In the embodiment illustrated, the heat shield includes one or more layers (4) of the refractory composite. The layers (4) are produced by a combination of refractory fibers and a compatible refractory binder.

The refractory fibers can be used (as shown in the figures) in the form of a flexible textile, for example, as woven tapes, as braided sheaths or as felt tapes. Ceramic fibers, silica fibers or other inorganic refractories can be used as the refractory fibers.

The refractory binder is illustrated by dashes, labeled (5), and can be a cement, a ceramic adhesive or another slip (for example, one based on sodium silicate, $Na_2SiO_3$, clay and water). The refractory binder is in a liquid or paste form to properly wet and impregnate the fibers.

The role of the binder is to agglomerate the fibers to one another and to densify their structure, in order to seal the shield and thus be able to limit the thickness and the weight of the shield, while still providing an effective thermal barrier against radiation and convection, and a barrier against possible chemical attack. The role of the textile fibers is to provide the composite with mechanical strength, by reinforcing the composite, and to guarantee the uniformity of the thickness of the thermal protection device.

Advantageously, but not necessarily, a number of refractory tiles (6) can be fastened on the outside of the layer (4), or as a replacement for one or both thicknesses of the fibers. The refractory tiles (6) preferably have the shape of rectangular plates, tangentially and adhesively bonded or fastened by any suitable adhesive or binder (7) to the tube, and with a pre-established distribution along the tube (or tubes). The plates will generally be adhesively bonded to the face of the tube which is oriented toward the high temperature heating load, that is to say, on the inside of the inductor, between the turns and the load. The plates will be denser, to make a radiation screen, or less dense, in the form of a felt, to reduce conduction.

In the severest of cases, an available alternative is to superpose a fibrous ceramic plate (8), in the form of a relatively rigid felt, which forms a conduction screen, on the dense ceramic plate (6), which forms a radiation screen.

The strength of the adhesion of the refractory tiles to the electrically insulated conductor is achieved by an intimate impregnation of the adhesive into the refractory fibers placed over the conductor. Prior taping of the conductor with refractory fibers allows good attachment of the refractory adhesive (7) which is used to fasten the plates to the electrically insulated conductor, especially if the electrical insulation is covered with a skin of a silicone elastomer, a material which is well known for being a non-stick material.

The width of the plates can be greater than the external diameter of the tube so as to form a screen. The plates are easy to install and to replace should they become damaged, reducing the maintenance cost of the furnace.

As an alternative, the refractory composite layer (4) can be a more or less liquid paste, comprised of nonwoven refractory fibers intimately mixed with the binder (5) prior to application. Such a paste can then be applied to the insulated component to be protected by means of a suitable applicator.

In the foregoing text, and in the drawings, tubes having a circular cross section are shown as a non-limiting example. Of course, the improvements of the present invention will apply to any type of sectional shape, such as oval, square or other shapes, and the plates can be adhesively bonded to one of the faces of the tube, tangentially or non-tangentially.

I claim:

1. A thermal protection device for covering an electrical conductor of an inductive industrial furnace, wherein the electrical conductor includes conducting turns formed of hollow copper tubes for receiving circulating cooling water, wherein the hollow copper tubes are covered with an electrically insulating layer, wherein the electrical conductor conducts, for variable durations, a current under high external temperature conditions which are potentially damaging to the insulating layer, and wherein the thermal protection device covers the insulating layer and the hollow copper tubes, and is formed from at least one layer of a composite refractory material comprised of a combination of refractory fibers and a compatible refractory binder which constitute a heat shield for withstanding external temperatures of between 500 and 1,600° C.

2. The thermal protection device of claim 1 wherein the refractory fibers form a woven tape.

3. The thermal protection device of claim 1 wherein the refractory fibers form a nonwoven tape.

4. The thermal protection device of claim 3 wherein the nonwoven tape is a felt tape.

5. The thermal protection device of claim 2 wherein the refractory fibers form tapes arranged in at least one layer of overlapping windings.

6. The thermal protection device of claim 1 wherein the refractory fibers are in a paste.

7. The thermal protection device of claim 6 wherein the paste is formed of nonwoven fibers premixed with a binder.

8. The thermal protection device of claim 1 which further includes a plurality of refractory tiles coupled with the electrical conductor.

9. The thermal protection device of claim 8 wherein the refractory tiles are bonded to the electrical conductor.

10. The thermal protection device of claim 8 wherein the refractory tiles have a varying density.

11. The thermal protection device of claim 8 wherein a plate formed of a fibrous ceramic material is superposed on a plate formed of a dense ceramic material.

12. The thermal protection device of claim 8 wherein the refractory binder intimately impregnates the refractory fibers, and wherein the intimate impregnation of the refractory binder and the refractory fibers placed over the electrical conductor adheres the refractory tiles to the electrical conductor.

13. A copper tube forming conducting turns of an electrical conductor of an inductive industrial furnace, wherein the copper tube is hollow, for receiving circulating cooling water, and covered with an electrically insulating layer, wherein the electrical conductor conducts, for variable durations, a current under high external temperature conditions which are potentially damaging to the electrically insulating layer, and wherein the insulating layer and the copper tube are covered with a thermal protection device formed from at least one layer of a composite refractory material comprised of a combination of refractory fibers and a compatible refractory binder which constitute a heat shield for withstanding external temperatures of between 500 and 1,600° C.

14. The copper tube of claim 13 which further includes a plurality of refractory tiles coupled with the electrical conductor.

15. The copper tube of claim 14 wherein the refractory tiles are bonded to the electrical conductor.

16. The copper tube of claim 14 wherein the refractory tiles have a varying density.

17. The copper tube of claim 14 wherein a plate formed of a fibrous ceramic material is superposed on a plate formed of a dense ceramic material.

18. The copper tube of claim 14 wherein the refractory binder intimately impregnates the refractory fibers, and wherein the intimate impregnation of the refractory binder and the refractory fibers placed over the electrical conductor adheres the refractory tiles to the electrical conductor.

19. An inductor for an industrial furnace, wherein the inductor is an electrical conductor including conducting turns formed of hollow copper tubes, for receiving circulating cooling water, and covered with an electrically insulating layer, wherein the electrical conductor conducts, for variable durations, a current under high external temperature conditions which are potentially damaging to the electrically insulating layer, and wherein the insulating layer and the copper tubes are covered with a thermal protection device formed from at least one layer of a composite refractory material comprised of a combination of refractory fibers and a compatible refractory binder which constitute a heat shield for withstanding external temperatures of between 500 and 1,600° C.

20. The inductor of claim 19 which further includes a plurality of refractory tiles coupled with the electrical conductor.

21. The inductor of claim 20 wherein the refractory tiles are bonded to the electrical conductor.

22. The inductor of claim 20 wherein the refractory tiles have a varying density.

23. The inductor of claim 20 wherein a plate formed of a fibrous ceramic material is superposed on a plate formed of a dense ceramic material.

24. The inductor of claim 20 wherein the refractory binder intimately impregnates the refractory fibers, and wherein the intimate impregnation of the refractory binder and the refractory fibers placed over the electrical conductor adheres the refractory tiles to the electrical conductor.

* * * * *